(12) United States Patent
Inoue et al.

(10) Patent No.: US 8,015,870 B2
(45) Date of Patent: Sep. 13, 2011

(54) FLOWMETER FOR MEASURING A FLOW RATE USING A HEAT EXCHANGE PRINCIPLE

(75) Inventors: Masaki Inoue, Cupertino, CA (US); Hidetaka Yada, Takatsuki (JP)

(73) Assignee: Horiba STEC, Co., Ltd., Kyoto (JP)

( * ) Notice: Subject to any disclaimer, the term of this patent is extended or adjusted under 35 U.S.C. 154(b) by 182 days.

(21) Appl. No.: 12/524,158

(22) PCT Filed: Jan. 21, 2008

(86) PCT No.: PCT/JP2008/050695
§ 371 (c)(1),
(2), (4) Date: Jul. 22, 2009

(87) PCT Pub. No.: WO2008/090839
PCT Pub. Date: Jul. 31, 2008

(65) Prior Publication Data
US 2010/0037688 A1      Feb. 18, 2010

(30) Foreign Application Priority Data

Jan. 26, 2007   (JP) ................................. 2007-016392

(51) Int. Cl.
*G01F 1/68* (2006.01)
(52) U.S. Cl. .................................................. 73/204.11
(58) Field of Classification Search .................. None
See application file for complete search history.

(56) References Cited

U.S. PATENT DOCUMENTS 5,719,341 A * 2/1998 Reynolds et al. .......... 73/861.95

FOREIGN PATENT DOCUMENTS

| JP | 03195924 | 8/1991 |
| JP | 08338746 | 12/1996 |
| JP | 2002310757 | 10/2002 |
| JP | 2004045290 | 2/2004 |
| JP | 2006078218 | 3/2006 |

OTHER PUBLICATIONS

ISA/Japanese Patent Office, International Search Report of PCT/JP2008/050695, Mar. 4, 2008, 2 pages, Japan.

* cited by examiner

*Primary Examiner* — Harshad Patel
(74) *Attorney, Agent, or Firm* — Alleman Hall McCoy Russell & Tuttle LLP

(57) ABSTRACT

Provided is a flowmeter with a flow tube through which fluid flows; a cooling apparatus adapted to cool a part of the flow tube; a first temperature detecting section for detecting the temperature of the flow tube cooled by the cooling apparatus; a second temperature detecting section for detecting the temperature of the cooling apparatus; a third temperature detecting section for detecting the temperature of a non-cooling area upstream of a cooling area in the flow tube; and an information processing section, which controls the cooling apparatus make a difference between the temperature detected by the second temperature detecting section and the temperature detected by the third temperature detecting section to be a prescribed value, and calculates the flow rate of the fluid flowing in the flow tube.

4 Claims, 7 Drawing Sheets

FLOWMETER FOR MEASURING A FLOW RATE USING A HEAT EXCHANGE PRINCIPLE

FIELD OF THE INVENTION

The present invention relates to a flowmeter, and more particularly to a flowmeter for measuring a large flow rate using a heat exchange principle.

BACKGROUND

Conventionally, a flowmeter for measuring a large flow rate (e.g., 5 CCM (mL/min) or more) measures a flow rate by providing, in addition to a sensor pipe, a bypass pipe to branch fluid, because of characteristics of the sensor.

However, in particular, in the case of measuring a flow rate of highly viscous fluid, and in some other cases, air bubbles are retained in inlets of the sensor and the bypass pipes. As a result, there arises a problem that a branch flow ratio between the fluid flowing into the sensor pipe and that flowing into the bypass pipe is changed, which causes a measurement error.

On the other hand, as described in Patent document 1, there is a flowmeter for a small flow rate, which uses a single pipe without branching fluid. This flowmeter is adapted such that a part of a flow tube through which the fluid flows is cooled by an electronic cooling apparatus (Peltier element or the like), and includes: a first temperature detecting section for detecting a temperature of a cooling region of the flow tube; a second temperature detecting section for feedback control and detecting a temperature of a portion of the cooling apparatus, which is away from the flow tube; and a third temperature detecting section for detecting a temperature of a non-cooling region on an upstream side of the cooling region of the flow tube. Also, the flowmeter controls the cooling apparatus such that a difference ($T_3-T_2$) between a detected temperature $T_2$ by the second temperature detecting section and a detected temperature $T_3$ by the third temperature detecting section becomes constant. The flowmeter measures a temperature change upon flow of the fluid through the flow tube by the first temperature detecting section, and measures a flow rate of the fluid on the basis of a temperature difference ($T_1-T_2$) between the detected temperature $T_2$ by the second temperature detecting section and that $T_1$ by the first temperature detecting section.

However, in the case where this flow meter is applied to a large flow rate measurement, the fluid passes through the flow tube at high speed, so that the fluid flowing into the cooling region is not sufficiently cooled, and therefore a value of the temperature difference ($T_2-T_1$) increases (see left-hand side of FIG. 7).

Also, there exists a problem that, as illustrated in FIG. 8, because of the large flow rate, temperature distribution occurs in the electronic cooling apparatus, and therefore even if the control is performed on the basis of the detected temperature $T_2$ by the second temperature detecting section, the large flow rate fluid cannot be sufficiently cooled.

As a result, there arises a problem that a curve indicating $\Delta T_{X\% \text{ of large flow rate}}/\Delta T_{100\% \text{ of large flow rate}}$, which represents linearity at a flow rate X % of the large flow rate, is separated from a linear line (linearity is deteriorated) (see right-hand side of FIG. 7). Accordingly, there arises a problem that, for example, a small variation of a zero point of the first temperature detecting section due to external disturbance causes a large measurement error (see right-hand side of FIG. 7).

Also, it is possible to increase a capacity of the cooling apparatus; however, there arises a problem that the entire apparatus is increased in size.

Patent document 1: Japanese Unexamined Patent Publication No. 2004-45290

SUMMARY

The present invention is therefore made in order to solve the above problems at once, and has a desired object to improve linearity and enable a stable large flow rate measurement without increasing the entire apparatus in size.

That is, a flowmeter according to the present invention includes: a flow tube through which fluid flows; a cooling apparatus adapted to cool a part of the flow tube; a first temperature detecting section adapted to detect a temperature of a cooling region of the flow tube, the cooling region being cooled by the cooling apparatus; a second temperature detecting section adapted to detect a temperature of the cooling apparatus; a third temperature detecting section adapted to detect a temperature of a non-cooling region on an upstream side of the cooling region in the flow tube; and an information processing section adapted to control the cooling apparatus so as to make a difference between a detected temperature by the second temperature detecting section and a detected temperature by the third temperature detecting section equal to a predetermined value, and calculate a flow rate of the fluid flowing through the flow tube on a basis of a difference between the detected temperature by the second temperature detecting section and a detected temperature by the first temperature detecting section, wherein the second temperature detecting section is arranged in a vicinity of an area where temperature is first influenced in the cooling apparatus by the fluid because of the flow of the fluid through the flow tube. Note that "a vicinity of an area where temperature is first influenced" refers to the area, or the vicinity of the area, where the temperature is first influenced, and "the vicinity area" refers, in physical terms, to a range in which the second temperature detecting section can be brought as close as possible to the area where the temperature is first influenced, from the perspective of a structure of the cooling apparatus, and in functional terms, to a range allowing a function of the flowmeter according to the present invention to be produced.

Anything like this can sufficiently cool the fluid and improve linearity even in the case of a large flow rate measurement because the second temperature detecting section is arranged in the vicinity of the area where the temperature is first influenced in the cooling apparatus by the fluid. Also, even in the case of a large flow rate measurement, a single pipe configuration can be made, and a capacity of the cooling apparatus is not required to be increased, so that it is not necessary to increase the flowmeter in size. Further, it is not necessary to worry about air bubble retention, and therefore a stable flow rate measurement can be made.

As a specific embodiment of the cooling apparatus, the cooling apparatus preferably includes: a Peltier element having an endothermic surface on one side and an exothermic surface on the other side; and a highly thermal conductive plate member provided on the endothermic surface, the highly thermal conductive plate member having a cover part covering the part of the flow tube.

In this case, as a specific arrangement aspect of the second temperature detecting section, the second temperature detecting section is preferably arranged in a vicinity of an area where temperature is first influenced in the plate member by the fluid because of the flow of the fluid through the flow tube.

Further, in order to further improve the linearity in the large flow rate measurement, the information processing section preferably changes the difference between the detected temperature by the third temperature detecting section and the detected temperature by the second temperature detecting section according to the flow rate.

According to the present invention configured as above, linearity is improved, and simultaneously a stable large flow rate measurement can be made without increasing the entire apparatus in size.

DESCRIPTION OF REFERENCE NUMERALS

Figure 1:
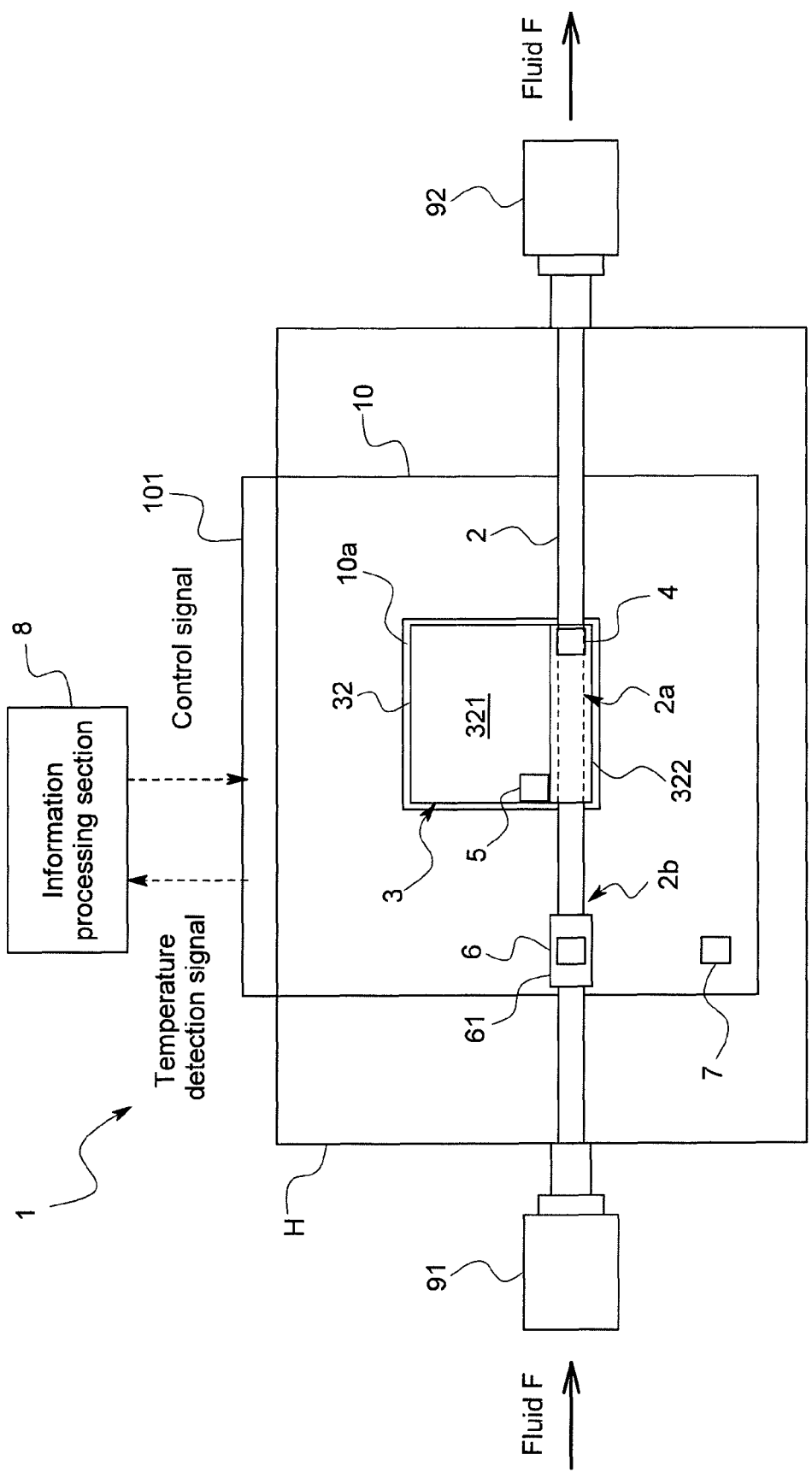
FIG. 1 is a schematic configuration diagram of a flowmeter according to one embodiment of the present invention.

1: Flowmeter
2: Flow tube
3: Cooling apparatus
31: Peltier element
32: Plate member
4: First temperature detecting section
5: Second temperature detecting section
6: Third temperature detecting section
7: Fourth temperature detecting section
8: Information processing section

DETAILED DESCRIPTION

Figure 2:
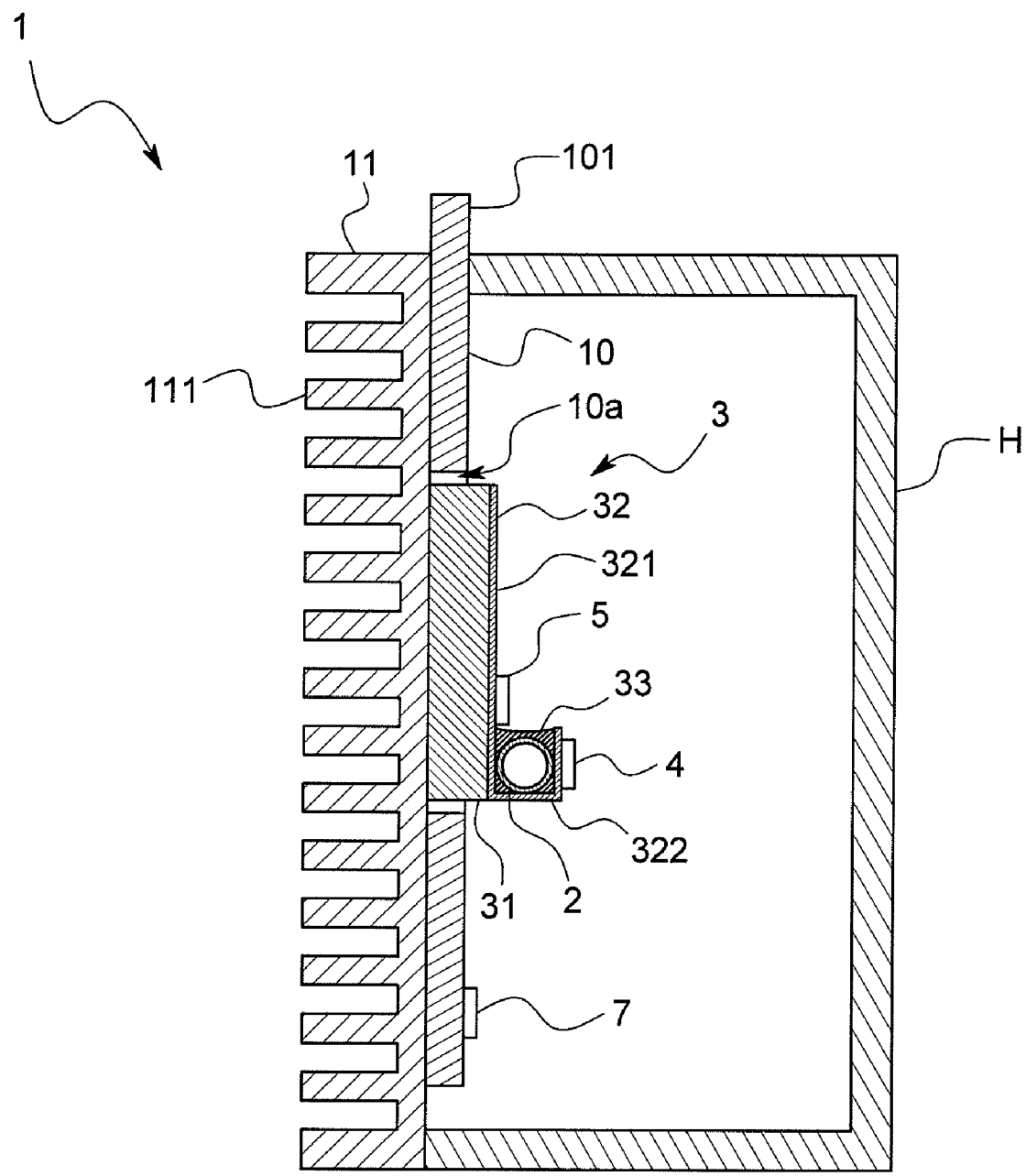
FIG. 2 is a vertical cross-sectional view of the flowmeter in the same embodiment.

One embodiment of the present invention is described below with reference to the drawings. In addition, FIG. 1 is a schematic configuration diagram illustrating a flowmeter 1 according to the present embodiment. FIG. 2 is a vertical cross-sectional view of the flowmeter 1, and FIG. 3 is a perspective view of the flowmeter 1.

<Apparatus Configuration>

Figure 3:
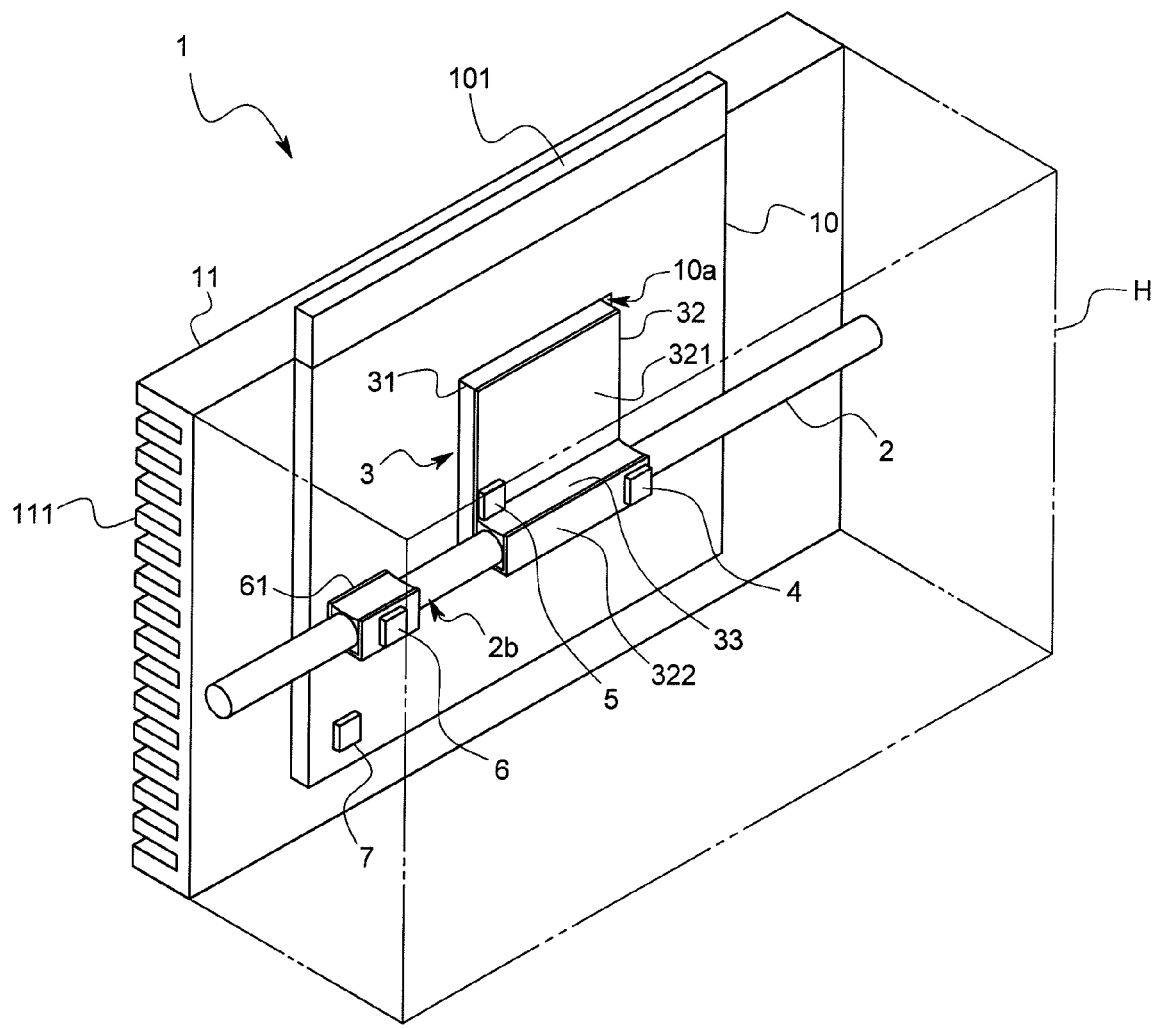
FIG. 3 is a perspective view of the flowmeter in the same embodiment.

As illustrated in FIGS. 1 to 3, the flowmeter 1 according to the present embodiment includes: a flow tube 2 through which fluid F flows; a cooling apparatus 3 adapted to cool a part of the flow tube 2; a first temperature detecting section 4 adapted to detect a temperature of a cooling region 2a of the flow tube 2, the cooling region 2a being cooled by the cooling apparatus 3; a second temperature detecting section 5 adapted to detect a temperature of the cooling apparatus 3; a third temperature detecting section 6 adapted to detect a temperature of a non-cooling region 2b on an upstream side of the cooling region 2a in the flow tube 2; a fourth temperature detecting section 7 adapted to detect an ambient temperature inside a housing H containing the cooling apparatus 3 and the like; and an information processing section 8 adapted to receive detection signals from the four temperature detecting sections 4 to 7 to control the cooling apparatus 3 and calculate a flow rate through the flow tube 2.

In the following, the respective sections 2 to 8 are described.

The flow tube 2 is a straight pipe inside which the fluid F such as liquid or gas is circulated, and formed of, for example, stainless steel having an outer diameter of 0.8 mm and an inner diameter of 0.6 mm. As described, the flow tube 2 is formed of the stainless steel having an excellent thermal conductivity, and therefore a stable large flow rate measurement having excellent response can be quickly made. Also, both ends of the flow tube 2 are respectively provided with joint members 91 and 92 for making connections to external piping. Further, the flow tube 2 is provided such that a middle portion thereof is inserted into the housing H.

The housing H is one having a substantially rectangular parallelepiped shape made of, for example, stainless steel, and containing the cooling apparatus 3, the four temperature detecting sections 4 to 7, and a wiring board 10. Insertion portions of the flow tube 2 into the housing H, and a projection portion of the wiring board 10 from the housing H are configured with a seal member or the like to close gaps such that an inside of the housing H is brought into an airtight state that shields the inside from the outside.

The wiring board 10 is formed on an upper surface thereof with a current circuit for supplying a predetermined current to the four temperature detecting sections 4 to 7, a temperature control circuit for controlling the cooling apparatus 3, and the like. Also, the wiring board 10 includes a connecting terminal section 101 for making a connection to the information processing section 8 outside the housing H, and the connecting terminal section 101 is projected outside the housing H. In the central portion of the wiring board 10, an opening 10a is provided, and inside the opening 10a, the cooling apparatus 3 is provided.

The cooling apparatus 3 is one provided inside the housing H, and intended to cool the part (cooling region 2a) of the flow tube 2 disposed inside the housing H, and has: a Peltier element 31 having an endothermic surface on one side toward the flow tube 2 and an exothermic surface on the other side; and a highly thermal conductive plate member 32 that is provided on the endothermic surface, and has a cover part 322 covering the part (cooling region 2a) of the flow tube 2.

The Peltier element 31 is a flat plate shape, and a voltage applied by an unshown power supply is controlled to thereby control a temperature of the endothermic surface thereof. Also, on the exothermic surface of the Peltier element 31, a heat sink 11 is provided in contact with the exothermic surface. The heat sink 11 is provided so as to block a lower part of the opening of the housing H, and includes a plurality of radiation fins 111 on an outer side thereof.

The plate member 32 is formed of an excellent thermal conductive material such as stainless steel, copper, or platinum, and includes: a flat plate part 321 provided in contact with the endothermic surface of the Peltier element 31; and the cover part 322 that is provided so as to project from one side of the flat plate part 321, and of an inverted L-shape.

Also, in a trough portion formed of a part of the flat plate part 321 and the cover part 322, the flow tube 2 is contained. As described, a portion of the flow tube 2 contained in the trough portion corresponds to the cooling region 2a. Further, the present embodiment is adapted such that an adhesive 33 is filled in a gap between the trough portion and the flow tube 2, and thereby thermal contact between the flow tube 2 and the plate member is achieved to quickly provide heat transfer.

The first temperature detecting section 4, attached onto a downstream side outer surface of the cover part 322 of the plate member 32, is for detecting a temperature of the cooling region 2a of the flow tube 2. Also, the first temperature detecting section 4 outputs a temperature detection signal corresponding to the temperature to the information processing section 8. As the first temperature detecting section 4, a linear thermistor, a platinum thermometer, a resistance temperature element, a winding, a thermocouple, or the like can be used. In particular, the resistance temperature element is preferable for improving measurement accuracy. Note that, for second, third, and fourth temperature detecting sections 5, 6, and 7 to be described later, the same type of element can be used.

The second temperature detecting section 5, attached onto a surface of the plate member 32, is for detecting a temperature of the endothermic surface of the Peltier element 31. Also, the second temperature detecting section 5 outputs a temperature detection signal corresponding to the temperature to the information processing section 8.

A specific arrangement of the second temperature detecting section 5 is described.

The second temperature detecting section 5 is attached in the vicinity of an area where temperature is first influenced in the cooling apparatus 3 by the fluid F because of the flow of the fluid F through the flow tube 2, i.e., in the vicinity of an upstream side portion of the cooling region 2a of the flow tube 2. Note that the vicinity of the area where temperature is first influenced refers to an area where the second temperature detecting section 5 can be closest to the flow tube 2 from the perspective of a structure of the cooling apparatus 3. More specifically, the second temperature detecting section 5 is attached to the upstream side portion of the cooling region 2a of the flow tube 2 in the flat plate part 321 and the cover part 322 of the plate member 32, which contain (cover) the flow tube 2. In the present embodiment, the second temperature detecting section 5 is provided on an upstream side of a portion adjacent to the portion forming the trough portion (or a portion adjacent to the filling adhesive 33) in the flat plate part 321 of the plate member 32.

The second temperature detecting section 5 is arranged as described, so that temperature distribution in the Peltier element 31 caused by the flow of the fluid F can be preferably prevented, and therefore the fluid F can be more effectively cooled to a predetermined temperature. That is, by adjusting a power provided to the Peltier element 31 according to a flow rate, heat exchange can be sufficiently performed even in the case of a large flow rate.

The third temperature detecting section 6 is for detecting a temperature of the flow tube 2 of the non-cooling region 2b on the upstream side of the cooling region 2a of the flow tube 2 contained in the housing H, and is provided on a surface of the flow tube 2 by a detecting section holder 61. Also, the third temperature detecting section 6 outputs a temperature detection signal corresponding to the temperature to the information processing section 8.

The fourth temperature detecting section 7 is for measuring an ambient temperature inside the housing H. A placement location of the fourth temperature detecting section 7 is only required to be a site at which the ambient temperature inside the housing H can be detected, and in the present embodiment, the fourth temperature detecting section 8 is provided on a surface of the wiring board 10 inside the housing H. Also, the fourth temperature detecting section 7 outputs a temperature detection signal corresponding to the ambient temperature to the information processing section 8.

The information processing section 8 (flowmeter main body section) is for calculating a flow rate on the basis of the detected temperatures from the four temperature detecting sections 4 to 7. The information processing section 8 is a general-purpose or dedicated computer provided with a CPU, a memory, an input/output interface, an AD converter, and the like as an equipment configuration. Also, the information processing section 8 instructs the CPU, peripheral devices, and the like to cooperate according to a predetermined program stored in a predetermined area of the memory, and thereby controls the cooling apparatus 3 so as to make a difference $(T_3-T_2)$ (hereinafter referred to as a reference temperature difference $(T_3-T_2)$) between a detected temperature $T_2$ by the second temperature detecting section 5 and a detected temperature $T_3$ by the third temperature detecting section 6 equal to a predetermined value, as well as calculates the flow rate of the fluid F flowing through the flow tube 2 on the basis of a difference $(T_1-T_2)$ (hereinafter referred to as a measured temperature difference $(T_1-T_2)$) between the detected temperature $T_2$ by the second temperature detecting section 5 and a detected temperature $T_1$ by the first temperature detecting section 4.

In the following, a method for calculating the flow rate is described along with specific description of the information processing section 8.

The information processing section 8 instructs the current circuit to flow the predetermined current (e.g., 1.0 mA) to the four temperature detecting sections 4 to 7, as well as controls, in the temperature control circuit, the Peltier element 31 with use of, for example, PID so as to make the reference temperature difference $(T_3-T_2)$ between the detected temperature $T_2$ by the second temperature detecting section 5 and the detected temperature $T_3$ by the third temperature detecting section 6 equal to the predetermined value (e.g., 10° C.).

Under this condition, in the case where the fluid F does not flow through the flow tube 2, the temperature $T_2$ detected by the second temperature detecting section 5 and the temperature $T_1$ detected by the first temperature detecting section 4 become equal to each other because the plate member 32 of the cooling apparatus 3 is entirely at the same temperature, and therefore the measured temperature difference $(T_1-T_2)$ is zero.

On the other hand, in the case where the fluid F flows through the flow tube 2, the temperature $T_1$ detected by the first temperature detecting section 4 increases according to the flow rate of the fluid F, and therefore the measured temperature difference $(T_1-T_2)$ arises between the temperature $T_1$ detected by the first temperature detecting section 4 and the temperature $T_2$ detected by the second temperature detecting section 5. Accordingly, by making the reference temperature difference $(T_3-T_2)$ equal to the predetermined value and then measuring the measured temperature difference $(T_1-T_2)$, the flow rate of the fluid F flowing through the flow tube 2 can be obtained.

Further, in order to constantly keep a temperature difference between a setting temperature of the Peltier element 31 and a temperature of the fluid F at a certain value, the information processing section 8 detects with the fourth temperature detecting section 7 the ambient temperature inside the housing H in which the first, second, and third temperature detecting sections 4, 5, and 6 are provided. Then, the information processing section 8 adds a temperature difference $(T_4-T_3)$ between a temperature $T_4$ detected by the fourth temperature detecting section 7 and the temperature $T_3$ detected by the third temperature detecting section 6 to the temperature control value of the Peltier element 31 to control a temperature of the Peltier element 31 so as to follow a temperature variation of the fluid F.

For example, in the case where the Peltier element 31 is controlled so as to make the reference temperature difference $(T_3-T_2)$ between the temperature $T_3$ detected by the third temperature detecting section 6 and the temperature $T_2$ detected by the second temperature detecting section 5 equal to 10° C., the control is performed so as to make the temperature T of the Peltier element 31 equal to T=10° C.+α$(T_4-T_3)$, where α is an arbitrary correction factor. α can be obtained, for example, using simulation to find a value that obeys the temperature variation of the fluid for each type of fluid or equipment.

EFFECTS OF THE PRESENT EMBODIMENT

Based on the flowmeter 1 according to the present embodiment configured as described, the second temperature detecting section 5 is arranged in the area where the temperature is first influenced in the cooling apparatus 3 by the fluid F, so that even in the case of measuring a large flow rate, the fluid F can be sufficiently cooled, i.e., a first stage output $(\Delta T_{10\%}$ $(=T_2-T_{1\ 10\%}))$ can be suppressed, and therefore linearity can be improved.

Also, even in the case of measuring the large flow rate, it is not necessary to increase the flowmeter 1 in size because a single pipe configuration can be made without having to increase a capacity of the cooling apparatus 3. Since it is only necessary to change arrangement of the second temperature detecting section 5, and the existing flowmeter 1 can be used for a large flow rate measurement by slightly modifying the existing flowmeter 1. Further, because of the single pipe configuration, the problem of air bubble retention does not arise, and therefore the large flow rate can be stably measured.

<Other Variations>

Note that the present invention is not limited to the above-described embodiment. In the following description, members corresponding to those in the above-described embodiment are given the same symbols.

Figure 4:
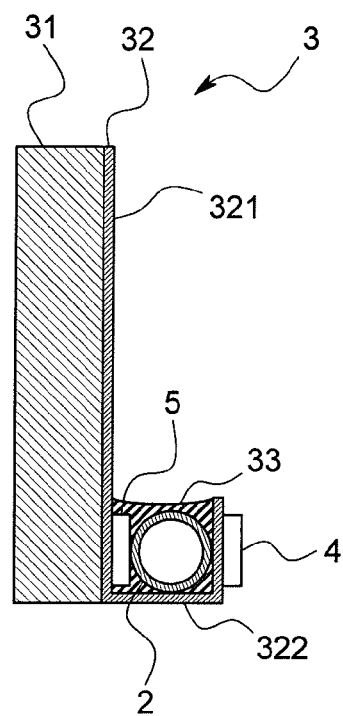
FIG. 4 is a vertical cross-sectional view illustrating cooling apparatus and temperature detecting sections of a flowmeter according to a variation.

For example, in the above-described embodiment, the second temperature detecting section 5 is provided on the upstream side of the portion adjacent to the portion forming the trough portion (or the portion adjacent to the filling adhesive 33) in the flat plate part 321 of the plate member 32; however, any variation in which the second temperature detecting section 5 is attached in the vicinity of the upstream side portion of the cooling region 2a of the flow tube 2 in the cooling apparatus 3 (plate member 32) is acceptable. As illustrated in FIG. 4, the second temperature detecting section 5 may be adapted to be provided on an upstream side of the portion, where the trough portion is formed in the flat plate part 321. In this case, the second temperature detecting section 5 is buried in the filling adhesive 33. As the adhesive 33, one having good thermal conductivity, or pasty one that becomes an elastic body after curing, is preferable. Specifically, silicon or the like is preferable.

Figure 5:
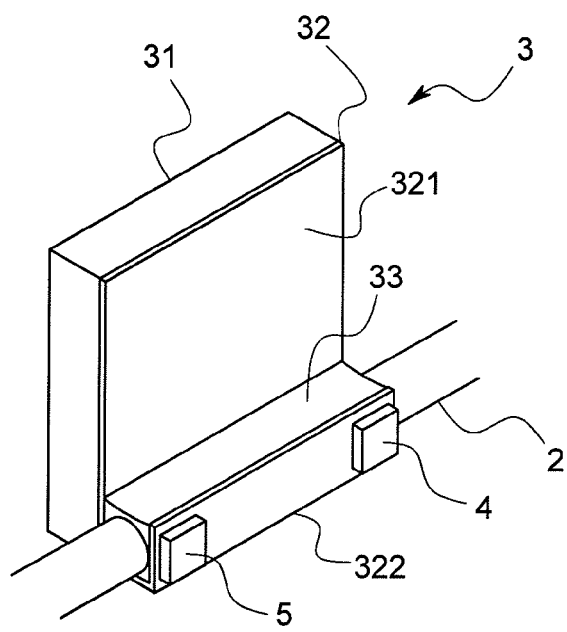
FIG. 5 is a perspective view illustrating a cooling apparatus and temperature detecting sections of a flowmeter according to another variation.

Also, as illustrated in FIG. 5, the second temperature detecting section 5 may be adapted to be provided on an upstream side outer surface (upstream side lateral surface or upstream side lower surface) of the cover part 322 of the plate member 32.

Further, the information processing section 8 may be adapted to change the reference temperature difference $(T_3-T_2)$ between the detected temperature $T_2$ by the second temperature detecting section 5 and the detected temperature $T_3$ by the third temperature detecting section 6 according to the flow rate.

Figure 6:
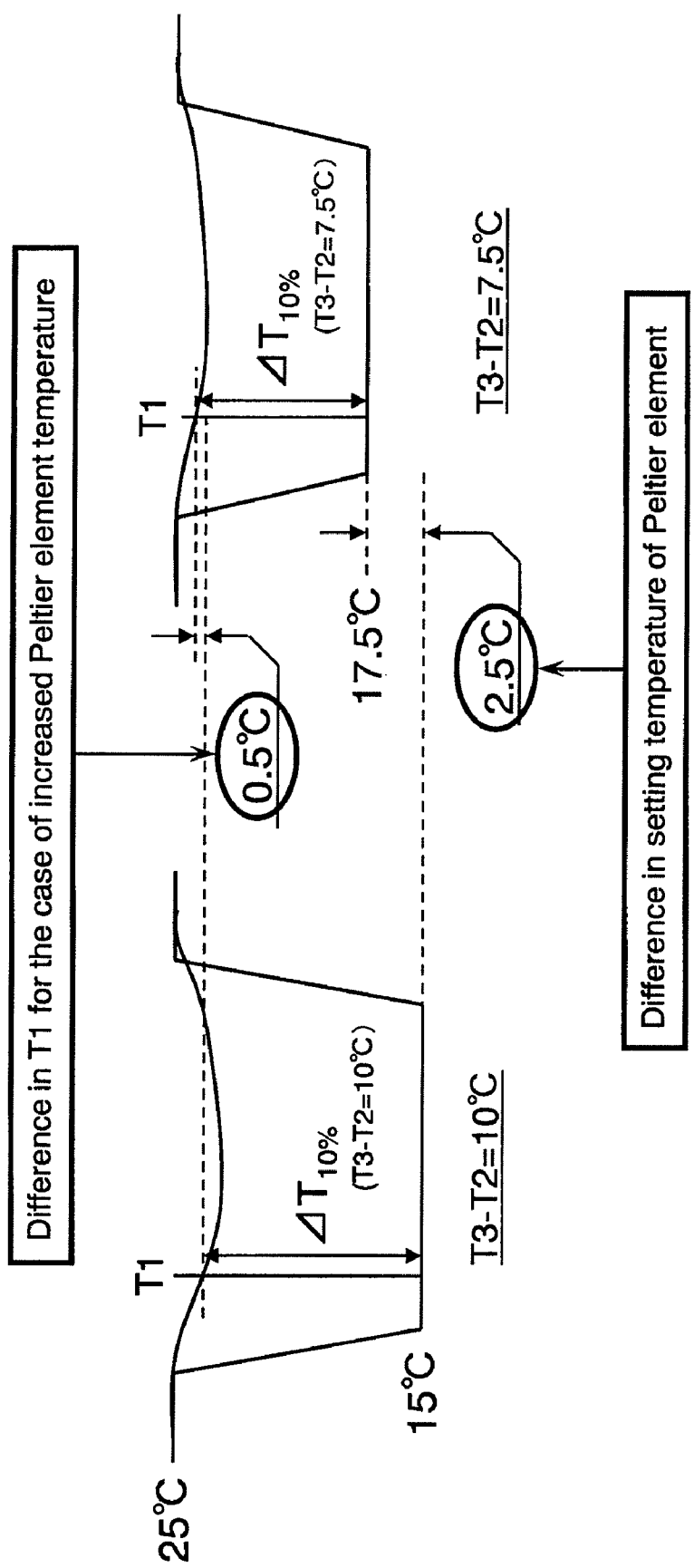
FIG. 6 is a diagram illustrating a fluid temperature variation for the case where a reference temperature difference of the flowmeter according to the another variation is changed.
Figure 7:
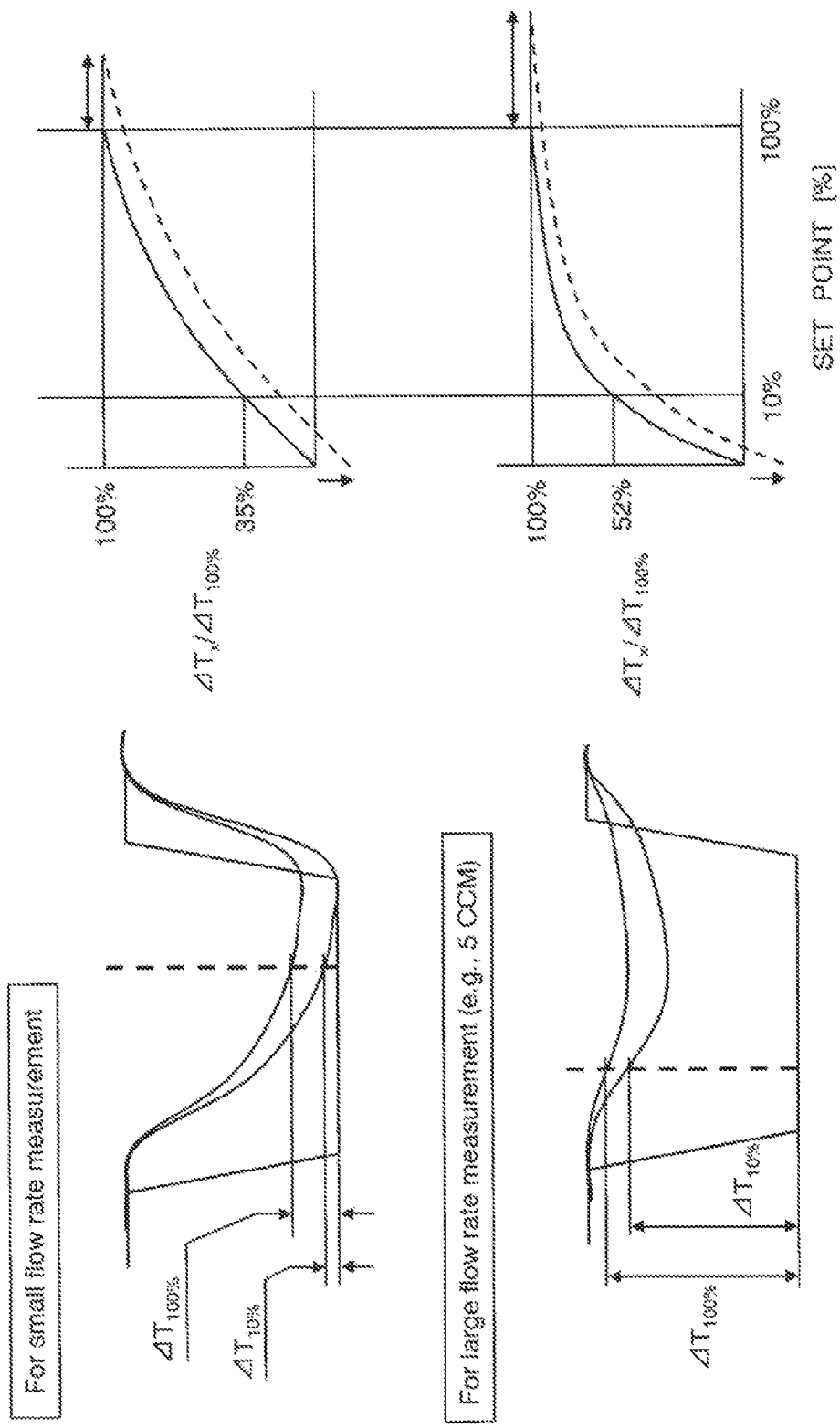
FIG. 7 is a diagram illustrating linearity for the case where a large flow rate measurement is made with use of a flowmeter of Patent document 1.
Figure 8:
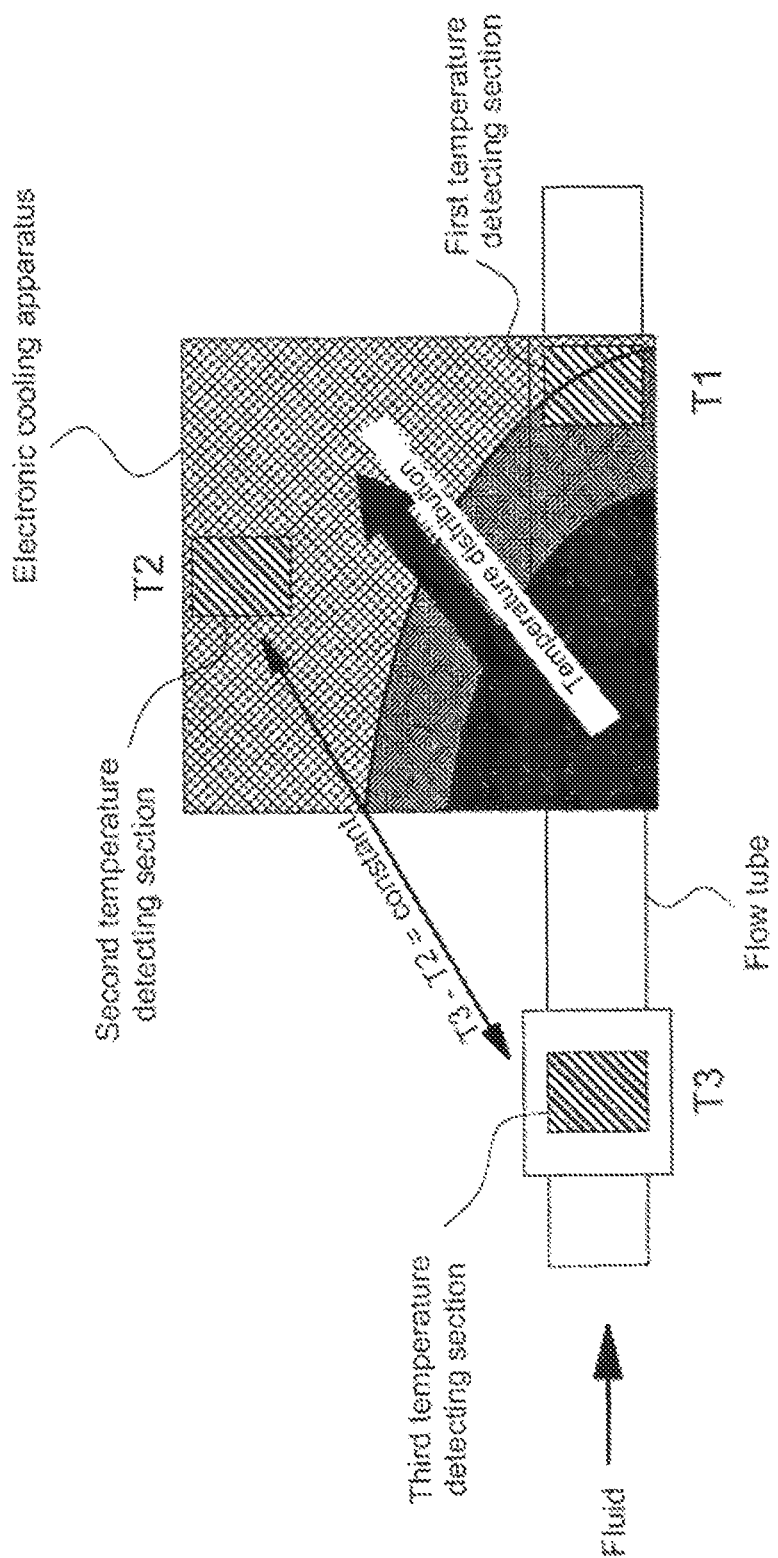
FIG. 8 is a schematic diagram illustrating temperature distribution that takes place upon fluid measurement.

Specifically, as illustrated in FIG. 6, the information processing section 8 controls the temperature of the Peltier element 31 so as to decrease the reference temperature difference $(T_3-T_2)$ as the flow rate is increased in a large flow rate range.

With the configuration thus, a ratio between the reference temperature difference $(T_3-T_2)$ and the measured temperature difference $(T_1-T_2)$ decreases by decreasing the reference temperature difference $(T_3-T_2)$, and therefore the linearity can be further improved in the large flow rate measurement.

Still further, the flow tube 2 of the above-described embodiment is formed with use of the stainless steel, but may be formed with use of, in addition to the other metal material such as aluminum, copper, or nickel, ethylene fluoride resin, polymer-series, or the like if a thickness thereof is thinned.

Additionally, the above-described embodiment is one in which the control temperature of the Peltier element 31 is corrected on the basis of the temperature difference between the ambient temperature inside the housing H and the temperature of the fluid F, using the temperature $T_4$ detected by the fourth temperature detecting section 7, but may be an embodiment in which the fourth temperature detecting section 7 is not used.

In addition, the above-described embodiment is one in which the flow rate of the fluid F is calculated by defining the reference temperature difference as $(T_3-T_2)$ and the measured temperature difference as $(T_1-T_2)$, but may also be adapted to calculate the flow rate of the fluid F by defining the reference temperature difference as $(T_3-T_2)$ and the measured temperature difference as $(T_2-T_1)$, the reference temperature difference as $(T_2-T_3)$ and the measured temperature difference as $(T_2-T_1)$, or the reference temperature difference as $(T_2-T_3)$ and the measured temperature difference as $(T_1-T_2)$.

Still additionally, the information processing section 8 may be adapted to add the temperature difference $(T_3-T_4)$ between the detected temperature $T_3$ by the third temperature detecting section 6 and the detected temperature $T_4$ by the fourth temperature detecting section 7 to the temperature control value of the Peltier element 31 to control the temperature of the Peltier element 31 so as to follow the temperature variation of the fluid F.

Besides, it should be appreciated that the above-described embodiment, and a part or all of the variations may be appropriately combined, and the present invention is not limited to the above-described embodiment, but may be variously modified without departing from the scope thereof.

INDUSTRIAL APPLICABILITY

According to the present invention, a large flow rate can be measured with improved linearity without increasing the entire apparatus in size.

What is claimed is:
1. A flowmeter comprising:
a flow tube through which fluid flows;
a cooling apparatus adapted to cool a part of the flow tube;
a first temperature detecting section adapted to detect a temperature of a cooling region of the flow tube, the cooling region being cooled by the cooling apparatus;
a second temperature detecting section adapted to detect a temperature of the cooling apparatus;
a third temperature detecting section adapted to detect a temperature of a non-cooling region upstream of the cooling region in the flow tube; and
an information processing section adapted to control the cooling apparatus so as to make a difference between a detected temperature by the second temperature detecting section and a detected temperature by the third temperature detecting section equal to a predetermined value, and calculate a flow rate of the fluid flowing through the flow tube on a basis of a difference between the detected temperature by the second temperature detecting section and a detected temperature by the first temperature detecting section, wherein the second temperature detecting section being arranged on the cooling apparatus so as to measure a temperature of a portion of the cooling apparatus in which a temperature is first influenced by the fluid because of the flow of the fluid through the flow tube, wherein the portion of the cooling apparatus is on an upstream side in the cooling region of the flow tube.

2. The flowmeter according to claim 1, wherein
the cooling apparatus comprises: a Peltier element having an endothermic surface on one side and an exothermic surface on the other side; and a highly thermal conductive plate member provided on the endothermic surface, the highly thermal conductive plate member having a cover part covering the part of the flow tube.

3. The flowmeter according to claim 2, wherein
the second temperature detecting section is further arranged in a vicinity of an area where, by the flow of the fluid through the flow tube, temperature is first influenced in the plate member by the fluid.

4. The flowmeter according to claim 1, wherein
the information processing section changes the difference between the detected temperature by the second temperature detecting section and the detected temperature by the third temperature detecting section according to the flow rate.

* * * * *